Oct. 11, 1949.                    R. E. FEARON                    2,484,493
         METHOD AND APPARATUS FOR MEASURING HARDNESS
              AND INTENSITY OF PENETRATING RADIATION
Filed June 29, 1948                              3 Sheets-Sheet 1

INVENTOR.
Robert Earl Fearon
BY
James Y. Cleveland
AGENT OR ATTORNEY

Oct. 11, 1949.    R. E. FEARON    2,484,493
METHOD AND APPARATUS FOR MEASURING HARDNESS
AND INTENSITY OF PENETRATING RADIATION
Filed June 29, 1948                    3 Sheets-Sheet 3

INVENTOR.
Robert Earl Fearon
BY
James Y. Cleveland
AGENT OR ATTORNEY

Patented Oct. 11, 1949

2,484,493

UNITED STATES PATENT OFFICE 2,484,493

METHOD AND APPARATUS FOR MEASURING HARDNESS AND INTENSITY OF PENETRATING RADIATION

Robert E. Fearon, Tulsa, Okla., assignor to Well Surveys, Incorporated, Tulsa, Okla., a corporation of Delaware Application June 29, 1948, Serial No. 35,784

14 Claims. (Cl. 250—83.6)

This invention relates to a method and apparatus for detecting and determining the hardness of penetrating radiation, such as gamma radiation.

Although the present invention has broad application it will be specifically described as applied to well surveying.

Various methods have been employed industrially and in the laboratories to determine the properties of gamma rays and X-rays. One of these methods, perhaps the oldest one, consists in the use of a series of absorbing filters whereby the law of absorption of the particular radiation in matter can be determined. Another familiar method involves the crystal grating spectrometer. U. S. Patent No. 2,285,840 has disclosed a method of determining the relative hardness of radiation received in a bore hole in connection with gamma-ray well logging. The patented method has not proven to be entirely satisfactory for several reasons. First, in measuring a difference, the statistical errors of the measurement become vastly worse, referred to the difference, than were statistical errors in the component measurements from which the difference was taken. Second, the difference in the radiation arriving in a bore hole from sources distributed throughout the adjacent matter will be smaller than the difference in the quality of the radiations emitted directly by the sources themselves. Third, in making the comparison by taking entirely separate logs on separate runs, systematic errors of a serious type are introduced.

A better understanding of the second above point can be had by reference to the behavior of cosmic rays in the atmosphere. As is well known the radiations arriving from space do not go very far in the atmosphere themselves, but the predominating processes quickly become almost entirely dependent upon various secondary radiations, the nature of which is determined more by the atmosphere than by the character of the primary radiations. The mesotrons, neutrons, and particles associated with shower processes are all generated in the atmosphere from material contained in the atmosphere and with a relative frequency which undoubtedly is largely determined by the composition of the atmosphere. Similarly, for gamma radiation sources distributed throughout the massive strata of the earth, radiations which emerge from any surface contain a very large component of degraded secondary radiations, the nature of which depends mostly on the average density of the strata and on the atomic number of the elements contained in them rather than on the properties of the source of radiation.

Obviously in a case in which the measurement is almost certain to be interfered with by statistical troubles, other sources of error should be held to a minimum. This means that the measurements should have been subtracted at the point of origin of the measuring process, rather than after the logs were drawn. This could not be done since there was no teaching of how to make two detector apparatuses occupy the same place at the same time.

The present invention makes it possible to put one detector within another which surrounds it concentrically. The outer detector may be made sufficiently absorbing to act as a filter and thus permit only the hardest component of radiation to reach the inner detector. Subtraction of the measurement can be effected at the point of origin, either by means of a null circuit or by making the gas convection circuit or the electrical measuring circuit alternate back and forth between the two detecting arrangements as disclosed in my copending applications Serial Numbers 572,666, now Patent No. 2,472,153, and 34,488. In the latter two cases, there would be an alternating current component in the output which could be adjusted to be zero for some particular hardness of radiation. This component would be an amount which would depend on the intensity of the radiation and on the amount of difference in quality.

Use can also be made of the fact that electron-positron pair-formation is extremely more probable in lead or bismuth than it is in lighter elements, opposing one detecting arrangement in which the working plates consist of lead or bismuth with other ones in which the working plates consist of copper or iron. Since the point at which efficient pair-formation commences is in the neighborhood of $2.1 \times 10^6$ electron volts, this method would serve as a satisfactory means of discriminating between the rocks that are rich in thorium and other rocks which owe their radiation mainly to potassium or members of the uranium-radium family or to members of the actinium series.

Therefore the primary object of this invention resides in the provision of a method and apparatus for detecting and measuring the hardness of penetrating radiation.

Another object of this invention resides in the provision of a method and apparatus whereby a subtraction of two measurements can be made at the point of origin of the measuring process.

Still another object of this invention resides in the provision of a method and apparatus whereby the foregoing objects can be achieved in a bore hole.

This invention further contemplates the concentric arrangement of a plurality of radiation detectors, each of which is adapted to respond to radiation having different minimum hardness.

Still another object of this invention resides in the utilization of one or more convection-current type ionization chambers to achieve the foregoing objects.

Other objects and advantages of the present invention will become apparent from the following detailed description when considered with the drawings, in which Figure 1 is a schematic illustration of one form of the present invention in which a null circuit is used to determine the hardness of penetrating radiation;

Figure 1:
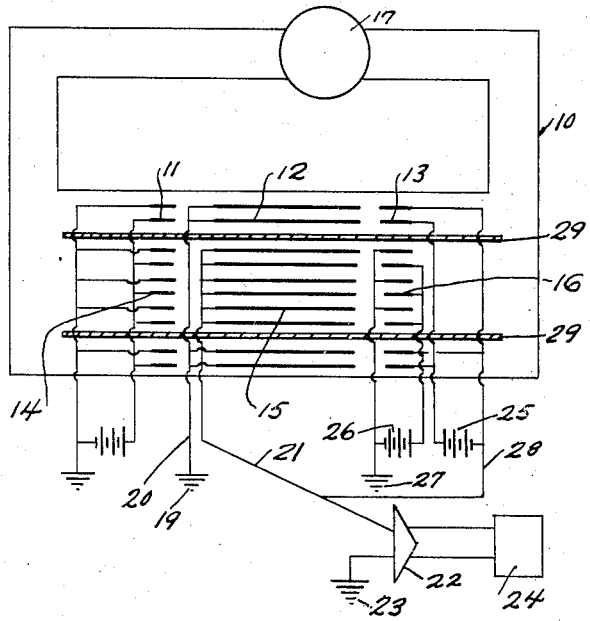

Referring to the drawings in detail, particularly Figure 1, a null arrangement is shown for determining the hardness of radiation. An ionizable medium is enclosed in a sealed circulating system 10. Since this invention is dependent for operation on the mobility of positive and negative ions, the ionizable medium is so chosen that on ionization cumbersome or relatively immobile ions are formed which can be transported a given distance before they can recombine with free electrons to form neutral molecules. Such a medium can be, for example, argon or helium containing a trace of a substance, such as xenon. The xenon forms with the argon or helium a mixture of gas which, when subjected to ionizing radiation, will form relatively immobile positive ions that can be transported by a moving current of gas a substantial distance before they can recombine with electrons to form neutral molecules.

Within the sealed system 10 there are disposed six groups of plates 11, 12, 13, 14, 15 and 16. Although groups of plates are shown it is to be understood that complicated surfaces may replace each group of plates. These complicated surfaces which collect the electrons may be the working plates which collect the electrons and may be replaced by a system of small tubes. An equivalent will also be a mass of steel wool or shavings, or, in fact, any shaping or conformation of electrically conducting matter having fine openings between metal surfaces, and disposing an extensive area of metal surface in a small amount of volume. The sealed system 10 is so arranged that the plates are disposed in separate paths of the ionizable medium which is circulated in the system by a pump 17. Groups 11, 12 and 13 are disposed in one path and groups 14, 15 and 16 are disposed in the other path. In a well surveying system groups 11, 12 and 13 would be concentrically disposed about groups 14, 15 and 16.

The plates of groups 11 and 14 are so arranged that alternate plates are connected to opposite sides of a battery 18 whose negative terminal is grounded. Battery 18 establishes an electrical field between the plates of each of the groups 11 and 14 which will de-ionize the gas being circulated over them.

The plates of groups 12 and 15 are respectively connected together. The plates of group 12 are connected to ground at 19 by the conductor 20. The plates of group 15 are connected by conductor 21 to one side of the input circuit of an amplifier 22. The other side of the input circuit of amplifier 22 is grounded at 23. The output of amplifier 22 is connected to a recorded or indicator 24.

Alternate plates of group 13 are connected to the opposite sides of a battery 25 and alternate plates of group 16 are connected to opposite sides of battery 26 whose negative terminal is grounded at 27. The negative terminal of battery 25, however, is connected by a conductor 28 to the conductor 21 which leads to the amplifier 22.

In operation the pump 17 circulates the enclosed ionizable medium in the direction indicated by the arrows. The ionizable medium divides and a portion flows over the inner plates of groups 14, 15 and 16 and the remaining portion flows over the plates of groups 11, 12 and 13. As the ionizable medium flows over the plates of groups 11 and 14 it is completely de-ionized. After de-ionization the medium then flows into the regions of the plates of groups 12 and 15 where it is subjected to the ionizing radiation that it is desired to measure. The negative ions formed in the region of the plates of group 12, due to their relatively high mobility, will diffuse to the plates of that group and the electrical charge so produced will be neutralized by the ground connection. On the other hand, the negative ions formed in the region of the plates of group 15 will diffuse to the plates of that group and the charge thus formed on these plates will produce a current which flows through the input circuit of amplifier 22.

The positive ions in both cases are swept out of the regions of the plates of groups 12 and 15 into the regions of the plates of groups 13 and 16, respectively. At this step in the process positive ions in the region of the plates of group 16 are drawn to the plates, where they are discharged, by the electrical field between the plates. The positive ions swept into the region of the plates of group 13 give up their charge to the plates and the electrical current thus produced flows through the input circuit of amplifier 22 in opposite polarity to that resulting from the collection of negative ions by the plates of group 15. By proper selection of radiation absorber 29 which is disposed between the two passageways and adjustment of the plates, the net effect of the input circuit of amplifier 22 will be zero for a certain hardness of penetrating radiation. The amplifier 22 amplifies the difference from zero which will exist in a practical case and convey it to the indicator or recorder 24. Indicator or recorder 24 will then indicate or record the difference from zero as an indication of the hardness or penetrating power and of the intensity of the radiation impinging on the system of the plates of groups 12 and 15.

Figure 2:
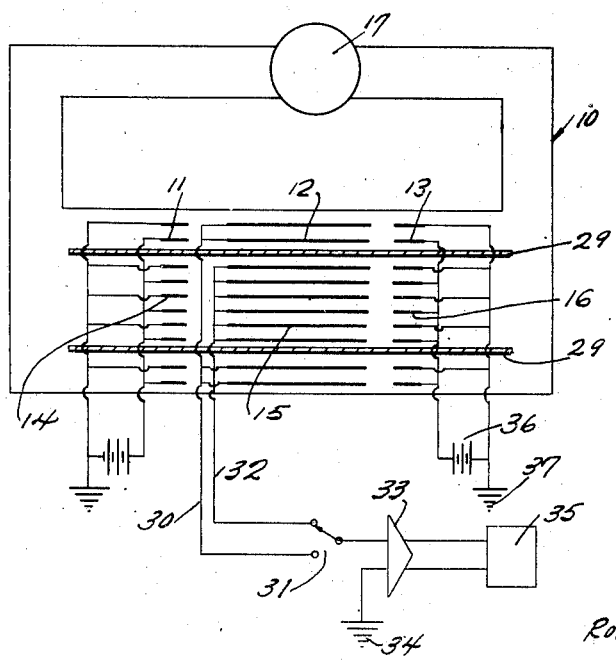
Figure 2 is a schematic illustration of another embodiment of this invention in which an electrical commutation method is used.

In Figure 2 there is illustrated a system by means of which the objects of this invention can be accomplished by electrical commutating means. The arrangement of the circulating systems and the groups of plates are the same as described in connection with Figure 1. However, the electrical circuits associated with the plates of groups 12, 13, 15 and 16 are different.

The same type of ionizable medium that is employed in the system as illustrated in Figure 1 may be used in this form of the invention.

By reference to Figure 2 it will be seen that the plates of groups 11 and 14 are electrically connected in the same manner as disclosed in Figure 1 and function in the same manner in this form of the invention. The plates of group 12 are all connected together and a conductor 30 is brought out to a point on a commutating switch 31. The plates of group 15 are connected together and a conductor 32 is brought out from them to a second point on the commutating switch 31. The commutating switch 31 may be driven by the same prime mover, not shown, that drives the pump 17, to alternately make contact with the switch points to which conductors 30 and 32 are connected. The moving element of switch 31 is connected to one side of the input circuit of an alternating current amplifier 33. The other side of the amplifier input circuit is connected to ground at 34. The output circuit of amplifier 33 is connected to a recorder or indicator 35.

Alternate plates of groups 13 and 16 are connected together and to opposite sides of battery 36 which has its negative side grounded at 37.

In the operation of the invention as illustrated in Figure 2, negative ions are collected by the plates of groups 12 and 15. (Here again, it is to be understood that the plates of groups 11, 12 and 13 lie outside of the plates of groups 14, 15 and 16 and are separated from them by a suitable absorber.) If the amount of current produced by the collection of negative ions on the plates of group 12 equals the amount of current produced by the collection of negative ions on the plates of group 15, and if the switch 31 switches cyclically back and forth on the contacts to which conductors 30 and 32 are connected, spending equal intervals of time on each of the two contacts, there will be no current output at the frequency of the switching cycle. If a more penetrating radiation falls on the system, then the inner-electrode system consisting of the plates of the groups 14, 15 and 16 will transfer more charge, relatively, thereby destroying the equality of the current conducted to the two switch contacts. Accordingly, the magnitude of the output signal from the alternating current amplifier at the frequency of switching will serve as a measure of the intensity and the penetrating power of the radiation falling on the entire system of plates contained in the sealed circulating system 10.

Figure 3:
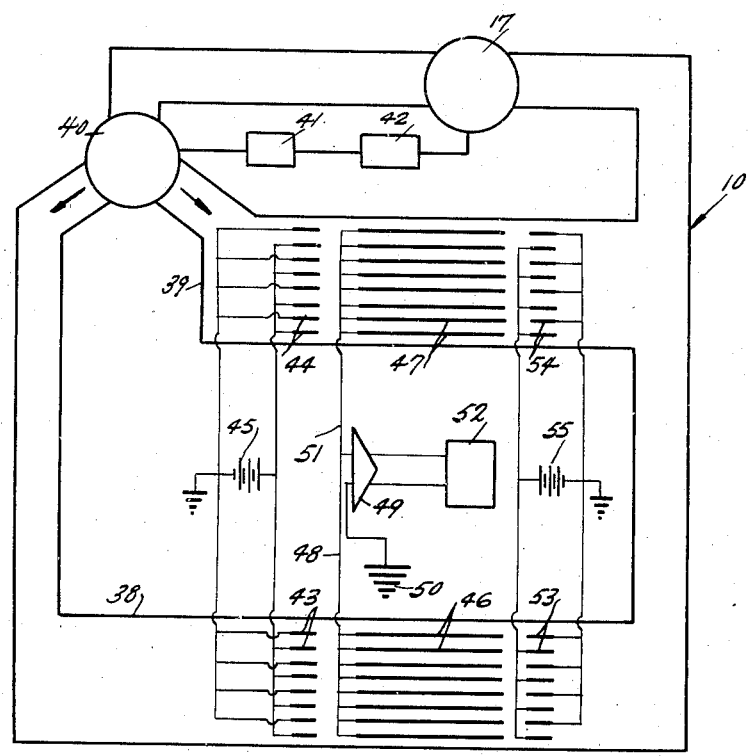
Figure 3 is a schematic illustration of a third embodiment of the present invention in which a valve is used to alternately divert the ionizing medium in two separate channels.

Still another embodiment of the present invention is shown in Figure 3. In this form of the invention the sealed system 10, in which the ionizable medium is circulated by the pump 17, is also divided to form concentric paths 38 and 39 for the circulating ionizable medium. A valve 40, which may be of the rotary type is used to alternate the flow of the ionizable medium in the paths 38 and 39. Valve 40 may be driven through a speed-changing gear-box 41 by a synchronous motor 42 which may also drive the pump 17.

The ionizable medium, in its flow through the paths 38 and 39, flows first over groups 43 and 44 of de-ionizing plates. Group 43 being disposed in path 38 and group 44 being disposed in path 39, alternate plates of each group are electrically connected together and to opposite sides of the battery 45. The negative side of battery 45 is grounded. The gas after being de-ionized by the electrical field between the plate groups 43 and 44 flows into the region of plate groups 46 and 47 located in paths 38 and 39 respectively. Each of the groups 46 and 47 have their plates electrically connected together. A conductor 48 leads from group 46 to one side of the input circuit of an alternating current amplifier 49. The other side of the input circuit of amplifier 49 is grounded at 50. A conductor 51 connects group 47 to conductor 48. The output of the alternating current amplifier 49 is conducted to an indicator or recorder 52.

Following plate groups 46 and 47 respectively are groups 53 and 54 of de-ionizing plates. Alternate plates in each of these groups are connected together and to opposite sides of a battery 55. The negative side of battery 55 is grounded.

In operation of the form of the invention illustrated in Figure 3 circulating gas is alternately diverted into paths 38 and 39 in such a manner that the gas flows one half of the time in one path and one half of the time in the other path. The operation is cyclic, permitting equal intervals of flow in each path. The gas or ionizable medium is subjected to penetrating radiation when it is in the regions of plate groups 46 and 47. If the number of negative ions absorbed by diffusion on the plates 46 equals the number of negative ions absorbed by diffusion on the plates 46, there will be no current flow in the input circuit of the amplifier 49 and therefore no signal recorded or indicated. If, however, more penetrating radiation falls on the entire system, a larger portion of current will be produced by the system of plates 47 because of the greater fraction of the radiation which reaches them on the inside. The alternating current delivered by the amplifier 49 to the indicator or recorder 52 and measured at the frequency of the valve cycle will serve as an indication of the intensity and the penetrating power of the radiations incident upon the entire electrode system.

Figure 4:
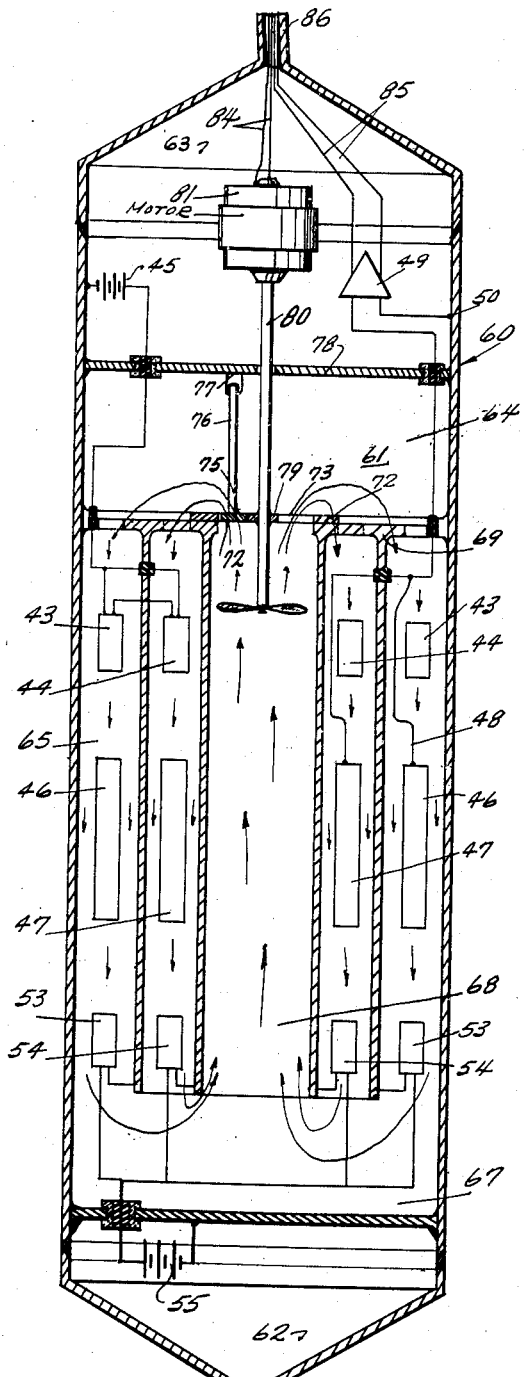
Figure 4 is a schematic illustration, shown in vertical section, illustrating the manner in which the present invention may be applied to well surveying systems.

In Figure 4 there is illustrated an application of the invention as disclosed in Figure 3 to a well surveying system. In this figure an apparatus adapted to traverse a well bore is shown schematically in vertical section.

Figure 5A:
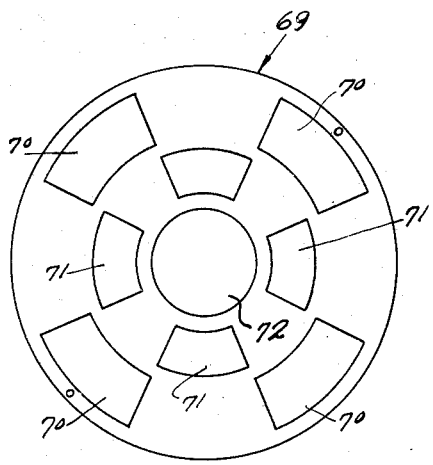
Figure 5 shows in enlarged plan view a valve arrangement for diverting the ionizable medium into alternate paths.

Referring to Figure 4, the housing 60 is divided into three sealed compartments 61, 62 and 63. Compartment 61 houses the sealed ionizable medium circulating system. The system comprises the chamber 64, concentric passageways 65 and 66, bottom chamber 67 and passageway 68. Passageways 65 and 66 are open at their bottom ends to discharge the circulating ionizable medium into the bottom chamber 67. The top ends of passageways 65 and 66 terminate in a header plate 69 which is shown in detail in Figure 5a. Header plate 69 is fixed to an annular shoulder formed on the inner surface of the housing 60. Openings 70 in the header plate serve as ports through which the gas can flow from the chamber 64 into the passageway 65. Openings 71, in a like manner, serve as ports through which the gas can flow from the chamber 64 into the passageway 66. The central opening 72 provides a passageway for the gas to enter the chamber 64 from passageway 68.

Disposed on top of header-plate 69 is a valve plate 72. Valve plate 72 is provided with a central opening 73 defined by gear teeth 74 into which a gear 75 is adapted to mesh. Gear 75 is carried by a shaft 76 that is journaled in a bearing 77 carried by the partition 78. Gear 75 is adapted to be driven by a gear 79 that is mounted for rotation with shaft 80. Shaft 80 is adapted to be driven by a motor 81 mounted in compartment 63. The lower end of shaft 80 drives the pump 82 to circulate the gas or ionizable medium through the passageways.

Figure 5B:
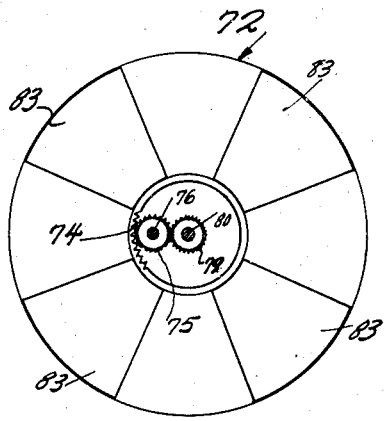

Again referring to the valve plate which is shown in detail in Figure 5b, it will be noted that it too is provided with openings 83 that are adapted to alternately register, on rotation of the valve plate, with the openings 70 and 71 in the header plate 69.

The electrical connections and circuits associated with the groups of plates are the same as described in connection with Figure 3 and as far as possible the same reference characters have been used.

The operation of the system shown in Figure 4 is the same as that described in connection with Figure 3.

The conductors 84, which supply power to the motor 81, and the conductors 85, which conduct the output from amplifier 49 to the surface of the earth, may be enclosed in a cable 86 which passes up the bore hole and communicates with the surface recording equipment.

It is to be understood that conventional raising and lowering means can be used to lower and raise the device in a bore hole while measuring the depth automatically as the signals are recorded.

Those forms of this invention illustrated in Figures 1 and 2 may be adapted to well surveying in a similar manner.

I claim:

1. A method of measuring the hardness of penetrating radiation that comprises subjecting an ionizable medium which is being circulated through at least two separate paths to a known intensity of the penetrating radiation, filtering from one path a considerable fraction of the radiation having hardness below a predetermined value, and measuring the difference between the ionization produced in each path at the origin of said measurement.

2. A method of measuring the hardness of penetrating radiation that comprises subjecting an ionizable medium which is being intermittently circulated through at least two separate paths to a known intensity of the penetrating radiation, filtering from one path a considerable fraction of the radiation having hardness below a predetermined value, and measuring the difference between the ionization produced in each path at the origin of said measurement.

3. A method of measuring the hardness of penetrating radiation that comprises subjecting an ionizable medium which is being alternately circulated through at least two separate paths to a known intensity of the penetrating radiation, filtering from one path a considerable fraction of the radiation having hardness below a predetermined value, and measuring the difference between the ionization produced in each path at the origin of said measurement.

4. A method of measuring the hardness of penetrating radiation that comprises subjecting an ionizable medium which is being circulated through at least two separate paths to a known intensity of the penetrating radiation, filtering from one path a considerable fraction of the radiation having hardness below a predetermined value, and comparing the ionizations produced in the two paths, by automatically computing a function of the two currents which represents the said comparison, and causing a single electrical current to be produced which represents the said function.

5. A method of measuring the hardness and intensity of penetrating radiation that comprises subjecting an ionizable medium that is caused to circulate in at least two paths to the penetrating radiation, filtering a considerable fraction of the radiation having a hardness below a predetermined value from one of said paths, separately collecting electrons produced by ionization of the medium in each path, using the current produced by the collection of electrons in one path to null a component of the current produced by the collection of electrons in the other path, and measuring the unannulled difference between the null current and the total current produced in the other path.

6. A method of measuring the hardness and intensity of penetrating radiation that comprises subjecting an ionizable medium that is caused to intermittently circulate in at least two paths to the penetrating radiation, filtering a considerable fraction of the radiation having a hardness below a predetermined value from one of said paths, separately collecting electrons produced by ionization of the medium in each path, using the current produced by the collection of electrons in one path to null a component of the current produced by the collection of electrons in the other path, and measuring an unannulled difference between the null current and the total current produced in the other path.

7. A method of measuring the hardness and intensity of penetrating radiation that comprises subjecting an ionizable medium that is caused to alternately circulate in at least two paths to the penetrating radiation, filtering a considerable fraction of the radiation having a hardness below a predetermined value from one of said paths, separately collecting electrons produced by ionization of the medium in each path, using the current produced by the collection of electrons in one path to null a component of the current produced by the collection of electrons in the other path, and measuring the unannulled difference between the null current and the total current produced in the other path.

8. A method of measuring the hardness and intensity of penetrating radiation that comprises subjecting an ionizable medium that is caused to circulate in at least two paths to the penetrating radiation, filtering a considerable fraction of the radiation having a hardness below a predetermined value from one of said paths, separately and concurrently collecting electrons produced by ionization of the medium in each path, using the current produced by the collection of electrons in one path to null a component of the current produced by the collection of electrons in the other path, and measuring the unannulled difference between the two currents.

9. An apparatus for measuring the hardness and intensity of penetrating radiation that comprises in combination at least two concentrically disposed detectors, means interposed between said detectors for absorbing penetrating radiation having a hardness up to and including a predetermined value, an ionizable medium, means for circulating said ionizable medium in each detector, means for subjecting said detectors to penetrating radiation, means in each detector for collecting electrons produced by the ionization caused by said penetrating radiation, means for subtracting the current produced by the collection of electrons in one detector from the current produced by the collection of electrons in the other at the point of origin of the two currents and means for measuring the remainder of the current.

10. An apparatus for measuring the hardness and intensity of penetrating radiation that comprises in combination at least two concentrically disposed detectors, means interposed between said detectors for absorbing penetrating radiation having a hardness up to and including a predetermined value, an ionizable medium, means for circulating said ionizable medium in each detector, means for subjecting said detectors to penetrating radiation, means in each detector for collecting electrons produced by the ionization caused by said penetrating radiation, means for subtracting the current produced by the collection of electrons in one detector from the current produced by the collection of electrons in the other and means for measuring the remainder of the current.

11. An apparatus for measuring the hardness and intensity of penetrating radiation that comprises in combination at least two concentrically disposed detectors, means interposed between said detectors for absorbing penetrating radiation having a hardness up to and including a predetermined value, an ionizable medium, means for intermittently circulating said ionizable medium in each detector, means for subjecting said detectors to penetrating radiation, means in each detector for collecting electrons produced by the ionization caused by said penetrating radiation, means for subtracting the current produced by the collection of electrons in one detector from the current produced by the collection of electrons in the other at the point of origin of the two currents and means for measuring the remainder of the current.

12. An apparatus for measuring the hardness and intensity of penetrating radiation that comprises in combination at least two concentrically disposed detectors, means interposed between said detectors for absorbing penetrating radiation having a hardness up to and including a predetermined value, an ionizable medium, means for alternately circulating said ionizable medium in each detector, means for subjecting said detectors to penetrating radiation, means in each detector for collecting electrons produced by the ionization caused by said penetrating radiation, means for subtracting the current produced by the collection of electrons in one detector from the current produced by the collection of electrons in the other at the point of origin of the two currents and means for measuring the remainder of the current.

13. An apparatus for measuring the hardness and intensity of penetrating radiation that comprises in combination at least two concentrically disposed detectors, means interposed between said detectors for absorbing penetrating radiation having a hardness up to and including a predetermined value, an ionizable medium, means for circulating at a selected speed said ionizable medium in each detector, means for subjecting said detectors to penetrating radiation, means in each detector for collecting electrons produced by the ionization caused by said penetrating radiation, means for subtracting the current produced by the collection of electrons in one detector from the current produced by the collection of electrons in the other at the point of origin of the two currents and means for measuring the remainder of the current.

14. An apparatus for measuring the hardness and intensity of penetrating radiation that comprises in combination at least two concentrically disposed detectors, means interposed between said detectors for absorbing penetrating radiation having a hardness up to and including a predetermined value, an ionizable medium, means for circulating through a system of fine openings said ionizable medium in each detector, means for subjecting said detectors to penetrating radiation, means in each detector for collecting electrons produced by the ionization caused by said penetrating radiation, means for subtracting the current produced by the collection of electrons in one detector from the current produced by the collection of electrons in the other at the point of origin of the two currents and means for measuring the remainder of the current.

ROBERT E. FEARON.

No references cited.